United States Patent
Iwatsuki et al.

(10) Patent No.: US 11,045,978 B2
(45) Date of Patent: Jun. 29, 2021

(54) PARTICLE FOR SOLID FREEFORM FABRICATION, POWDER FOR SOLID FREEFORM FABRICATION, DEVICE FOR MANUFACTURING SOLID FREEFORM FABRICATION OBJECT, METHOD OF MANUFACTURING SOLID FREEFORM FABRICATION OBJECT, AND PARTICLE

(71) Applicants: Hitoshi Iwatsuki, Kanagawa (JP); Yasuyuki Yamashita, Kanagawa (JP); Kiichi Kamoda, Kanagawa (JP); Toshiyuki Mutoh, Kanagawa (JP); Yasutomo Aman, Kanagawa (JP); Toshiyuki Iseki, Kanagawa (JP); Mitsuru Naruse, Shizuoka (JP); Akira Saito, Kanagawa (JP); Shinzo Higuchi, Tokyo (JP); Sohichiroh Iida, Kanagawa (JP)

(72) Inventors: Hitoshi Iwatsuki, Kanagawa (JP); Yasuyuki Yamashita, Kanagawa (JP); Kiichi Kamoda, Kanagawa (JP); Toshiyuki Mutoh, Kanagawa (JP); Yasutomo Aman, Kanagawa (JP); Toshiyuki Iseki, Kanagawa (JP); Mitsuru Naruse, Shizuoka (JP); Akira Saito, Kanagawa (JP); Shinzo Higuchi, Tokyo (JP); Sohichiroh Iida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 321 days.

(21) Appl. No.: 16/184,244

(22) Filed: Nov. 8, 2018

(65) Prior Publication Data

US 2019/0134853 A1     May 9, 2019

(30) Foreign Application Priority Data

Nov. 9, 2017  (JP) .............................. JP2017-216016
Sep. 7, 2018  (JP) .............................. JP2018-167424

(51) Int. Cl.
*B29B 9/12*     (2006.01)
*B29C 64/153*   (2017.01)
(Continued)

(52) U.S. Cl.
CPC .............. *B29B 9/12* (2013.01); *B29C 64/153* (2017.08); *B33Y 70/00* (2014.12); *C08J 3/12* (2013.01);
(Continued)

(58) Field of Classification Search
None
See application file for complete search history.

(56) References Cited

U.S. PATENT DOCUMENTS 6,531,086 B1   3/2003   Larsson
9,718,218 B2   8/2017   Mikulak et al.
(Continued)

FOREIGN PATENT DOCUMENTS

JP   2006-106236      4/2006
JP     2010-64945     3/2010
WO   WO 2017/112723 A1   6/2017

OTHER PUBLICATIONS

Extended European Search Report dated Apr. 9, 2019 in Patent Application No. 18200043.0, 25 pages.
(Continued)

*Primary Examiner* — Mary Lynn F Theisen
(74) *Attorney, Agent, or Firm* — Oblon, McClelland, Maier & Neustadt, L.L.P.

(57) ABSTRACT

A particle for solid freeform fabrication having a columnar form has end surfaces and a side surface, wherein one of the end surfaces partially covers the side surface.

20 Claims, 6 Drawing Sheets

(51) Int. Cl.
- *B33Y 70/00* (2020.01)
- *B33Y 10/00* (2015.01)
- *B29B 9/06* (2006.01)
- *C08J 3/12* (2006.01)
- *B29K 101/12* (2006.01)

(52) U.S. Cl.
CPC ........... *B29B 9/06* (2013.01); *B29B 2009/125* (2013.01); *B29K 2101/12* (2013.01); *B33Y 10/00* (2014.12); *C08J 2329/14* (2013.01); *C08J 2367/02* (2013.01); *C08J 2371/10* (2013.01)

(56) References Cited

U.S. PATENT DOCUMENTS

| | | | |
|---|---|---|---|
| 2008/0217804 A1* | 9/2008 | Casalini | B29B 9/065 264/142 |
| 2009/0017395 A1 | 1/2009 | Ariyoshi et al. | |
| 2016/0160021 A1 | 6/2016 | Kojima et al. | |
| 2016/0177122 A1 | 6/2016 | Naruse et al. | |
| 2016/0236412 A1 | 8/2016 | Kusahara et al. | |
| 2016/0271877 A1 | 9/2016 | Suzuki et al. | |
| 2016/0271879 A1 | 9/2016 | Yamashita et al. | |
| 2017/0209927 A1 | 7/2017 | Yamashita et al. | |
| 2017/0217087 A1 | 8/2017 | Tamoto et al. | |
| 2017/0225404 A1 | 8/2017 | Naruse et al. | |
| 2018/0001520 A1 | 1/2018 | Saito et al. | |
| 2018/0022024 A1 | 1/2018 | Saito et al. | |
| 2018/0023219 A1 | 1/2018 | Saito et al. | |
| 2018/0147780 A1 | 5/2018 | Kamoda et al. | |
| 2018/0215917 A1 | 8/2018 | Naruse | |
| 2018/0264720 A1 | 9/2018 | Tamoto et al. | |
| 2018/0264721 A1 | 9/2018 | Iida et al. | |
| 2018/0273756 A1 | 9/2018 | Saito et al. | |

OTHER PUBLICATIONS

U.S. Appl. No. 16/007,064, filed Jun. 13, 2018, Akira Saito, et al.

* cited by examiner

PARTICLE FOR SOLID FREEFORM FABRICATION, POWDER FOR SOLID FREEFORM FABRICATION, DEVICE FOR MANUFACTURING SOLID FREEFORM FABRICATION OBJECT, METHOD OF MANUFACTURING SOLID FREEFORM FABRICATION OBJECT, AND PARTICLE

CROSS-REFERENCE TO RELATED APPLICATIONS

This patent application is based on and claims priority pursuant to 35 U.S.C. § 119 to Japanese Patent Application Nos. 2017-216016 and 2018-167424, filed on Nov. 9, 2017 and Sep. 7, 2018, respectively, in the Japan Patent Office, the entire disclosures of which are hereby incorporated by reference herein.

BACKGROUND

Technical Field

The present disclosure relates to a particle for solid freeform fabrication, a powder for solid freeform fabrication, a device for manufacturing a solid freeform fabrication object, a method of manufacturing a solid freeform fabrication object, and a particle.

Description of the Related Art

A powder bed fusion (PBF) method is known as a method of manufacturing a solid freeform fabrication object (three-dimensional object). The PBF method includes a selective a laser sintering (SLS) method to form a solid freeform fabrication object by selective irradiation of laser beams and a selective mask sintering (SMS) method in which laser beams are applied in a planar manner using a mask. In addition, known methods of manufacturing solid freeform fabrication objects other than the PBF method include a high speed sintering (HSS) method using ink, a binder jetting (BJ) method, etc.

SUMMARY

According to the present invention, provided is an improved particle for solid freeform fabrication which has a columnar form having end surfaces and a side surface, wherein one of the end surfaces partially covers the side surface

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
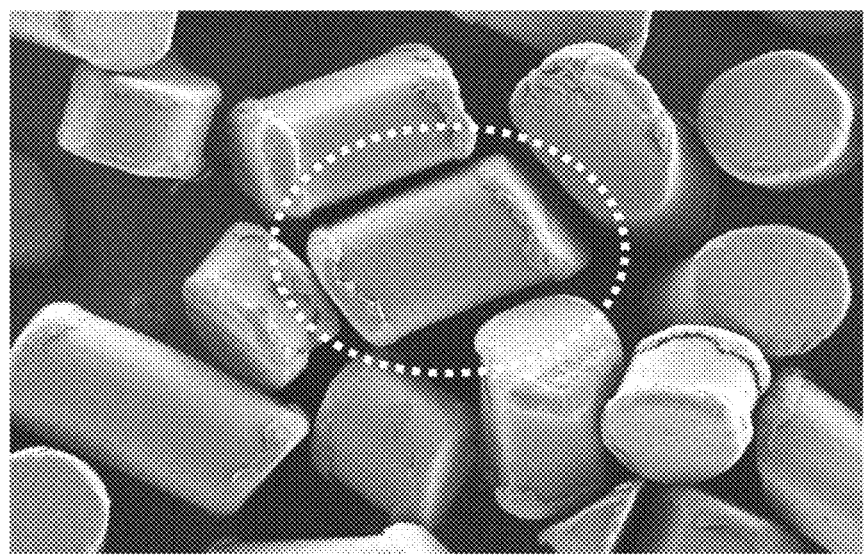
FIG. 1 is a photograph illustrating an example of powder for solid freeform fabrication.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

DETAILED DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

As a resin powder for use in manufacturing a solid freeform fabrication object, for example, a resin melt liquid is extruded and thereafter drawn (stretched) to form a resin fiber, which is fixed with a movable clamp and moved toward a cutting blade, where the resin fiber is cut to obtain resin powder having a substantially cylindrical resin powder.

However, the resin powder mentioned above is inferior regarding packing density, so that a solid freeform fabrication object formed by using the resin powder is inferior regarding strength.

Next, aspects of the present disclosure are described. The particle for solid freeform fabrication described below is just an example and the present disclosure is not limited thereto. Therefore, the particle may be used for a surface shrinkage agent, a spacer, a lubricant, a paint, a grinding stone, an additive, a secondary battery separator, foods, cosmetics, clothes, automobiles, precision instruments, semiconductors, aerospace, medicine, metal substitute material, etc.

Resin Powder for Solid Freeform Fabrication

The powder for solid freeform fabrication according to the present embodiment means an aggregate of a plurality of granular materials, and has a columnar form having end surfaces and a side surface, and one of the end surfaces partially covers the side surface. In addition, the powder for solid freeform fabrication may include particles which are not the particle for solid freeform fabrication described later.

Particle for Solid Freeform Fabrication

Form of Particle for Solid Freeform Fabrication

Figure 2:
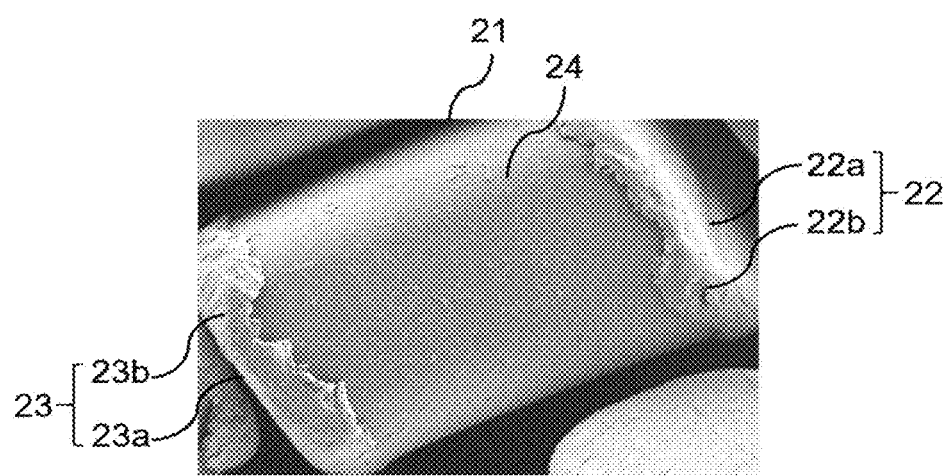
FIG. 2 is a photograph illustrating an example of a particle for solid freeform fabrication.

First, with reference to FIG. 1 and FIG. 2, particles for solid freeform fabrication (hereinafter also referred to as columnar articles) is described. FIG. 1 is a photograph illustrating an example of the powder for solid freeform fabrication. In addition, the columnar article enclosed by the dotted circle in FIG. 1 is one of a plurality of columnar articles present in FIG. 1. FIG. 2 is a photograph illustrating an example of the particle for solid freeform fabrication. FIG. 1 and FIG. 2 are photographs by scanning electron microscope (SEM) observation. Such a photograph (projected image) can be obtained by not only SEM but also a known image analyzer such as an optical microscope. In the following description, SEM is used as an example as the device to obtain a projected image.

As illustrated in FIG. 2, a column (columnar article) 21 includes a first surface 22 as an example of the end surface and a second surface 23 as an example of the end surface, and a side surface 24. The first surface 22 includes a first opposing surface 22a and a first perimeter area 22b having a form stretched along the side surface 24. The first perimeter area 22b is a continuous surface with the first opposing surface 22a via a curved surface and substantially orthogonal to the first opposing surface 22a. The second surface 23 includes a second opposing surface 23a facing the first opposing surface 22a and a second perimeter area 23b having a form stretched along the side surface 24. The second perimeter area 23b is a continuous surface with the second opposing surface 23a via a curved surface and substantially orthogonal to the second opposing surface 23a. The side surface 24 is adjacent to the first surface 22 and the second surface 23. In addition, the first perimeter area 22b and the second perimeter area 23b are stretched on the side surface 24. In other words, the side face 24 is covered in such a manner that the end face of the column 21 is bent. As in the present embodiment, it is preferable that both the end surfaces cover the entire circumference of the side surfaces in the area observed by an SEM. However, it is allowable that both of the end surfaces partially cover the side faces, one of the end surfaces covers the entire circumference of the side surface, or one of the end surfaces partially covers the side face. In addition, it is preferable that both the end surfaces cover the entire circumference of the side surfaces not only in the area observed by an SEM but also in the area not observed by an SEM. However, it is allowable that both of the end surfaces partially cover the side faces, one of the end surfaces covers the entire circumference of the side surface, or one of the end surfaces partially covers the side face.

The form of the first perimeter area 22b and the second perimeter area 23b (both of which are hereinafter also referred to as perimeter area) are at least distinguishable from the side surface 24 in an SEM image, etc. For example, a form of the perimeter area partially integrated with the side surface 24, a form of the perimeter area adjacent to the side surface 24, a form having a space between the perimeter area and the side surface 24 are allowed. In addition, the first perimeter area 22b and the second perimeter area 23b are preferably located along a surface direction substantially identical to the surface direction of the side surface 24.

As illustrated in FIG. 2, the first perimeter area 22b and the second perimeter area 23b are stretched along the side surface 24 and are situated thereon. In addition, each of the structures of the first surface 22 and the second surface 23 covering around the connection area of the first perimeter area 22b and the second perimeter area 23b and the side surface 24 is also referred to as a bottle cap form.

The first perimeter area 22b and the second perimeter area 23b respectively are forms of the first surface 22 and the second surface 23 stretching along the side surface 24. Therefore, the first perimeter area 22b and the first opposing surface 22a and the second perimeter area 23b and the second opposing surface 23a smoothly continue via curved surfaces. Due to the first perimeter area 22b and the second perimeter area 23b, the column 21 is free of a corner (pointed) portion or the proportion of the corner portion is reduced. Therefore, the packing density of powder for solid freeform fabrication including the column 21 can be increased, thereby enhancing the tensile strength of an obtained solid freeform fabrication object. Further, due to the column 21 without a corner portion, fluidity of powder for solid freeform fabrication including the column 21 can be enhanced, so that poor moving of the powder for solid freeform fabrication during solid freeform fabrication can be reduced, thereby enhancing the tensile strength of an obtained solid freeform fabrication object. In addition, the column 21 where all of the first perimeter area 22b and all of the second perimeter area 23b are stretched along (i.e., cover) the side surface 24 can enhance packing density and flowability of the column 21 required as the powder for solid freeform fabrication.

The first peripheral area 22b and the second area 23b, where the first surface 22 and the second surface 23 of the column 21 cover the side surface 24, preferably have a minimum length of 1 μm or more, more preferably 3 μm or more, and furthermore preferably 5 μm or more along the height direction of the column 21.

When the minimum length is 1 μm or more, the curved surface between the first opposing surface 22a and the first peripheral area 22b and the curved surface between the second opposing surface 23a and the second peripheral area 23b are more smooth, thereby increasing the packing density of the powder for solid freeform fabrication including the column 21 and enhancing the tensile strength of an obtained solid freeform fabrication object.

Further, the curved surface becomes more smooth. As a result, fluidity of the powder for solid freeform fabrication including the column 21 can be enhanced, so that poor moving of the powder during solid freeform fabrication can be reduced, thereby enhancing the tensile strength of an obtained solid freeform fabrication object. The first peripheral area and the second peripheral area are preferably a maximum length of 10 μm or more and more preferably 15

µm or more along the height direction of the column 21. This length is determined in the area observed in the projected area by an SEM, etc.

The form of the column 21 is not particularly limited and can be suitably selected to suit to a particular application. Examples are substantially cylindrical forms and substantially prismatic forms. Substantially prismatic forms are preferable. The substantially cylindrical forms and substantially prismatic forms include solid forms having the first peripheral area 22*b* and the second peripheral area 23*b*. The forms of the first opposing surface 22*a* and the second opposing surface 23*a* are determined depending on the form of the column 21. For example, in a case where a line (corner) in the height direction of the column 21 is not observed while a smooth surface is uniformly observed, the column 21 is substantially cylindrical and the first opposing surface and the second opposing surface are substantially circular. For example, in a case where multiple surfaces segmented by a line (corner) in the height direction of the column 21 is observed, the column 21 is substantially prismatic and the first opposing surface and the second opposing surface are substantially polygonal. It should be noted that a combination of a substantially polygonal first opposing surface 22*a* and a substantially circular second opposing surface 22*b* and the other way round are allowable.

As described above, the column 21 has the first opposing surface 22*a* and the second opposing surface 23*a* opposing each other. The first opposing surface 22*a* may be slanted against the second opposing surface 23*a*. However, the first opposing surface 22*a* and the second opposing surface 23*a* are preferably substantially parallel to each other. Both being substantially parallel to each other improves flowability of the powder for solid freeform fabrication including the column 21.

The ratio of the maximum length of the straight line drawn in the first opposing surface 22*a* or the second opposing surface 23*a* of the column 21 to the height of the column 21 is from 0.5 to 5.0, more preferably from 0.7 to 2.0, and furthermore preferably from 0.8 to 1.5.

Substantially Cylindrical Form

The substantially cylindrical form is not particularly limited and can be suitably selected to suit to a particular application. Examples are a substantially truly circular cylindrical form having a substantially truly circular first opposing surface 22*a* and a substantially truly circular second opposing surface 23*a* and a substantially ellipsoidal cylindrical form having a substantially truly ellipsoidal first opposing surface 22*a* and a substantially ellipsoidal second opposing surface 23*a*. Of these, a truly cylindrical form is preferable. The circular portion of the substantially cylindrical form may be partially missing. In addition, the substantial circle has a ratio of the major axis to the minor axis of from 1 to 10.

The size of the area of the first opposing surface 22*a* and the size of the area of the second opposing surface 23*a* may not be completely identical but the circle diameter ratio of the large surface to the small surface is preferably 1.5 or less. More preferably, the ratio is 1.1 or less in terms that the same form can be more densely packed.

The diameter of the substantially cylindrical form has no particular limit and can be suitably selected to suit to a particular application. For example, the diameter is preferably from 5 to 100 µm. When the substantially circle portion of the substantially cylindrical form is a substantially ellipse, the diameter means the major axis.

The height of the substantially cylindrical form has no particular limit and can be suitably selected to suit to a particular application. For example, the height is preferably from 5 to 100 µm.

Substantially Polygonal Prism

The form of the substantially polygonal prism is not particularly limited and can be suitably selected to suit to a particular application. Examples are polygonal prisms having a polygonal first opposing surface 22*a* and a polygonal second opposing surface 23*a* having a form of a substantially rectangular parallelepiped, a substantially cubic, a substantially triangular prism, a substantially hexagonal prism, etc. Of these, a substantially hexagonal prism is preferable and a substantially regular hexagonal prism is more preferable. In a substantially polygonal prism, particles (powder) can be packed without a space so that the tensile strength of an obtained solid freeform fabrication object can be enhanced. Note that the substantially polygonal prism may be partially missing.

The size of the area of the first opposing surface 22*a* and the size of the area of the second opposing surface 23*a* may not be completely identical but the ratio of the average of the sides of a polygon of the large surface to the small surface is preferably 1.5 or less. More preferably, the ratio is 1.1 or less in terms that the same form can be more densely packed.

The length of the longest straight line drawn on the first opposing surface 22*a* and the second opposing surface 23*a* of a substantially polygonal prism has no particular limit and can be suitably selected to suit to a particular application. For example, it is preferably from 5 to 100 µm.

The height of the substantially polygonal prism has no particular limit and can be suitably selected to suit to a particular application. For example, the height is preferably from 5 to 100 µm.

In the present disclosure, the side forming the height between the first opposing surface 22*a* and the second opposing surface 23*a* of the column 21 includes a crushed state (for example, barrel-like form in the case of a cylindrical form) as a result of the resin softening at cutting. However, space appears between powders having arcs. Therefore, the side is preferably straight in terms of more dense packing of powder.

Form without Point (Vertex)

Figure 3A:
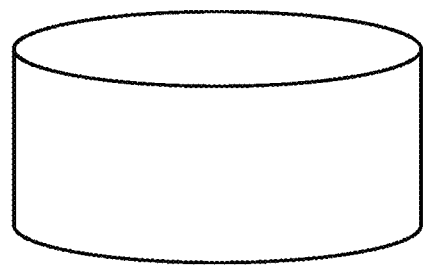
FIG. 3A is a diagram illustrating a schematic perspective view of an example of a particle for solid freeform fabrication having a cylindrical form.
Figure 3B:
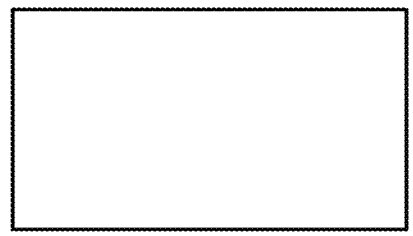
FIG. 3B is a diagram illustrating a side view of an example of the particle for solid freeform fabrication having a cylindrical form illustrated in FIG. 3A.
Figure 3C:
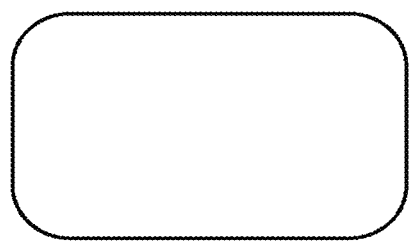
FIG. 3C is a diagram illustrating a side view of an example of the particle for solid freeform fabrication having a cylindrical form without a point at ends.
Figure 3D:
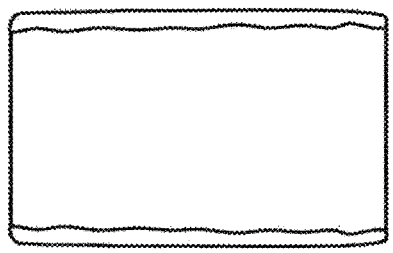
FIG. 3D is a diagram illustrating a side view of an example of the particle for solid freeform fabrication having a cylindrical form without a point at ends.
Figure 3E:
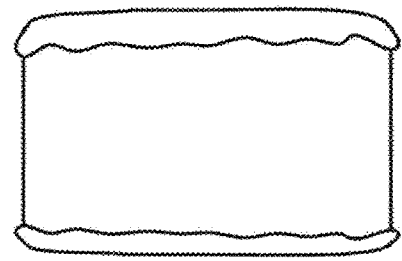
FIG. 3E is a diagram illustrating a side view of an example of the particle for solid freeform fabrication having a cylindrical form without a point at ends.
Figure 3F:
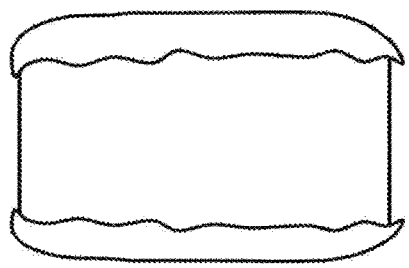
FIG. 3F is a diagram illustrating a side view of an example of the particle for solid freeform fabrication having a cylindrical form without a point at ends.
Figure 3G:
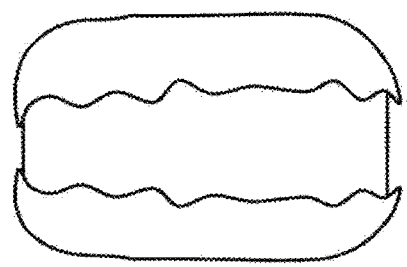
FIG. 3G is a diagram illustrating a side view of an example of the particle for solid freeform fabrication having a cylindrical form without a point at ends.
Figure 3H:
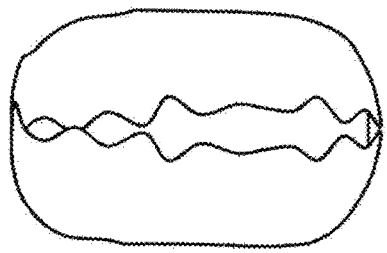
FIG. 3H is a diagram illustrating a side view of an example of the particle for solid freeform fabrication having a cylindrical form without a point at ends.
Figure 3I:
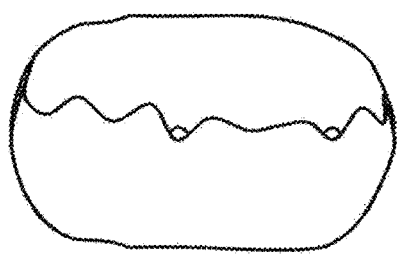
FIG. 3I is a diagram illustrating a side view of an example of the particle for solid freeform fabrication having a cylindrical form without a point at ends.

The column 21 preferably has no points (vertexes). The point means an angled portion present when the column 21 is observed from the side. The form of the column 21 is described with reference to FIGS. 3A to 3I. FIG. 3A is a diagram illustrating a schematic perspective view of an example of a particle for solid freeform fabrication having a cylindrical form. FIG. 3B is a diagram illustrating a side view of an example of the particle for solid freeform fabrication having a cylindrical form illustrated in FIG. 3A. FIG. 3C is a diagram illustrating a side view of an example of the particle for solid freeform fabrication having a cylindrical form without a point at ends. FIGS. 3D to 3I are diagrams illustrating side views of examples of the powder for solid freeform fabrication having a cylindrical form with no points at ends.

As the cylindrical form illustrated in FIG. 3A is observed from side, the form is rectangular as illustrated in FIG. 3B. It has angled portions, i.e., four points. Examples of forms with no points at ends are illustrated in FIGS. 3C to 3I. Whether a columnar article has a point can be determined by a projected image of the side plane of the columnar article. For example, the side of a columnar particle is observed by a scanning electron microscope (S4200, manufactured by Hitachi Ltd.), etc. to acquire a two-dimensional image. In this case, the projected image has four sides. When the portion formed of two adjacent sides is defined as an end part, if the end part is formed of only two adjacent straight lines, an angle is formed and the particle has a point. If the end part is arc as illustrated in FIGS. 3C to 3I, no point is formed at the end portion.

Amount of Particle for Solid Freeform Fabrication (Columnar-Article)

The proportion (based on the number) of the columnar article contained in the powder for solid freeform fabrication is preferably 50 percent or more and more preferably 70 percent or more to the powder for solid freeform fabrication.

As the proportion of the columnar article having the first peripheral area and the second peripheral area mentioned above in the powder for solid freeform fabrication increases, the packing density of the powder for solid freeform fabrication including the columnar article and the tensile strength of an obtained solid freeform fabrication object is enhanced. Further, as the proportion of the columnar article having the first peripheral area and the second peripheral area mentioned above in the powder for solid freeform fabrication increases, flowability of the powder for solid freeform fabrication including the columnar article can be enhanced, so that poor moving of the powder for solid freeform fabrication during solid freeform fabrication can be reduced, thereby enhancing the tensile strength of an obtained solid freeform fabrication object.

A specific calculation method of the amount of the columnar article is as follows: That is, a photograph of the powder is taken at a magnification of 150 times using an SEM, the number of powder particles for solid freeform fabrication and the number of the columnar articles are counted in the image, Thereafter, the number of the columnar articles is divided by the number of the powder for solid freeform fabrication and multiplied by 100 to obtain the amount (proportion).

The magnifying power of the SEM is suitably changed in accordance with the size of the powder for solid freeform fabrication. In addition, when counting the number of powder particles for solid freeform fabrication and the number of columnar article the SEM image, only the powder particle for solid freeform fabrication and the columnar article having a longest part of 20 µm or more in the SEM image are counted in the present application. Further, the number of powder particle for solid freeform fabrication is 100 when calculating the proportion of the columnar article.

The proportion (on number basis) of the columnar article having a substantially polygonal prism contained in the powder for solid freeform fabrication is preferably 40 percent or more to the powder for solid freeform fabrication.

As the proportion of the columnar article having a substantially polygonal prism having the first peripheral area and the second peripheral area mentioned above in the powder for solid freeform fabrication increases, the packing density of the powder for solid freeform fabrication including the columnar article and the tensile strength of an obtained solid freeform fabrication object is enhanced as described above.

Crystallinity of Particle for Solid Freeform Fabrication (Columnar-Article) The columnar article can be made of a thermoplastic resin. The thermoplastic resin is plasticized and melted upon application of heat. As the thermoplastic resins, crystalline resins can be used. The crystalline resin has a melt peak as measured according to ISO 3146 regulation (plastic transition temperature measuring method, JIS K7121 format).

A crystal-controlled crystalline thermoplastic resin is preferable as the crystalline resin. Of these, a crystalline thermoplastic resin having crystal size and crystal alignment controlled by a method of external stimuli such as heat, drawing, crystal nuclear material, ultrasonic treatment is more preferable.

The method of manufacturing the crystalline thermoplastic resin has no particular limit and can be suitably selected to suit to a particular application. For example, resin is heated to the glass transition temperature or higher and thereafter subject to annealing with an optional addition of crystal nucleating agent before the annealing to enhance crystallinity. Also, a method of applying an ultrasonic wave to enhance crystallinity, a method of dissolving a resin in a solvent and slowly evaporating the solvent to enhance crystallinity, a method of applying an external electric field to grow crystal or drawing and thereafter subjecting the highly-oriented or highly-crystallized article to a process such as pulverization, cutting, etc. are suitable.

For the annealing, the resin is heated at a temperature 50 degrees higher than the glass transition temperature thereof for three days and thereafter slowly cooled down to room temperature.

Melt liquid for solid freeform fabrication is extruded in fibrous form by an extruder during stirring at temperatures 30 degrees C. or greater higher than the melting point. The melt liquid is extended (stretched) to around 1/1 to around 1/10 to obtain fibers. The maximum extension ratio can be changed depending on resin and melt viscosity.

In the application of ultrasonic wave, glycerin (reagent grade, manufactured by Tokyo Chemical Industry Co. Ltd.) solvent is added to a resin in an amount of five times as much as the resin followed by heating to the temperature 20 degrees C. higher than the melting point. Thereafter, ultrasonic wave is applied thereto by an ultrasonic generator (ultrasonicator UP200S, manufactured by Hielscher Ultrasonics GmbH) at a frequency of 24 KHz and an amplitude of 60 percent for two hours. Thereafter, the resultant is rinsed with a solvent of isopropanol at room temperature preferably followed by vacuum drying.

In the external electric field application, after heating a resin at the glass transition temperature or higher, an alternative electric field (500 Hz) of 600 V/cm is applied thereto for one hour followed by slow cooling down.

In the powder bed fusion (PBF) method, a large temperature difference (temperature window) about crystal layer change is preferable to prevent warping during manufacturing of a solid freeform fabrication object. It is preferable that the crystal layer change be larger because resin powder having a large difference between the melting starting temperature and the recrystallization point during cooling has better fabrication property.

Composition of Particle for Solid Freeform Fabrication (Columnar Article)

Specific examples of the resin constituting the columnar article include, but are not limited to, polymers such as polyolefin, polyamide, polyester, polyether, polyphenylene sulfide, a liquid crystal polymer (LCP), polyacetal (POM, melting point of 175 degrees C.), polyimide, and a fluorochemical resin. These can be used alone or in combination. The thermoplastic resin may include additives such as flame retardants, plasticizers, heat stabilizing agents, and crystal nucleating agents, and polymer particles such as non-crystalline resins in addition to the polymers mentioned above. These can be used alone or in combination.

Specific examples of the polyolefin include, but are not limited to, polyethylene and polypropylene (PP, melting point of 180 degrees C.). These can be used alone or in combination.

Specific examples of the polyamide include, but are not limited to, polyamide 410 (PA410), polyamide 6 (PA6), polyamide 66 (PA66, melting point of 265 degrees C.), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T, melting point of 300 degrees C.), and polyamide 10T (PA10T). These can be used alone or in combination. PA9T is also referred to as polynonamethylene terephthal amide, constituted of a diamine having 9 carbon atoms and a terephthalic acid monomer. In general, since the carbon acid side is an aromatic series, PA9T is referred to as semi-aromatic series. Moreover, the polyamide in this embodiment includes aramid formed by p-phenylenediamine and a terephathalic acid monomer as whole aromatic series in which the diamine side is also aromatic.

Specific examples of the polyester include, but are not limited to, polyethyleneterephthalate (PET, melting point of 260 degrees C.), polybutadiene terephthalate (PBT, melting point of 218 degrees C.), and polylactic acid (PLA). To impart heat resistance, polyester including aromatic series partially including terephthalic acid and isophthalic acid is also suitably used in this embodiment.

Specific examples of the polyether include, but are not limited to, polyether etherketone (PEEK, melting point of 343 degrees C.), polyetherketone (PEK), polyether ketone ketone (PEKK), polyaryl ether ketone (PAEK), polyether ether ketone ketone (PEEKK), and polyetherkeone ether ketone ketone (PEKEKK). In addition to the polyether mentioned above, crystalline polymers are also suitable. Specific examples include, but are not limited to, polyacetal, polyimide, and polyether sulfone. It is also suitable to use polyamide having two melting peaks such as PA9T (it is necessary to raise the temperature of a resin to the second melting peak or higher to completely melt the resin).

It should be noted that the columnar article may optionally contain a fluidizier, a granulating agent, a reinforcing agent, and an antioxidant. The proportion of the fluidizer is sufficient if it covers the surface of particles and preferably from 0.1 to 10 percent by mass to the columnar article. Particulate inorganic material having a volume average particle diameter of less than 10 μm can be the fluidizer.

Properties of Powder

The powder for solid freeform fabrication as an example of the powder containing the columnar article preferably satisfies at least one of the following relations (1) to (3).

(1): $Tmf1 > Tmf2$, where $Tmf1$ represents the melting starting temperature of the endothermic peak as the powder is heated to a temperature 30 degrees C. higher than the melting point of the powder at a temperature rising speed of 10 degrees C. per minute and $Tmf2$ represents the melting starting temperature of the endothermic peak as the powder is heated to a temperature 30 degrees C. higher than the melting point of the powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute, and both $Tmf1$ and $Tmf2$ are measured in differential scanning calorimetry measuring according to ISO 3146 regulation. The melting starting temperature of the endothermic peak represents a temperature at a point −15 mW lower from a straight line drawn parallel to X axis from a site where quantity of heat becomes constant after endotherm at the melting point is finished to the lower temperature side.

(2): $Cd1 > Cd2$, where $Cd1$ represents a crystallinity obtained from an energy amount of the endothermic peak when the powder is heated to a temperature 30 degrees C. higher than the melting point of the powder at a temperature rising speed of 10 degrees C. per minute and $Cd2$ represents a crystallinity obtained from an energy amount of the endothermic peak as the powder is heated to a temperature 30 degrees C. higher than the melting point of the powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute, and both $Cd1$ and $Cd2$ are measured in differential scanning calorimetry measuring according to ISO 3146 regulation.

(3): $Cx1 > Cx2$, where $Cx1$ represents a crystallinity of the powder obtained by X-ray diffraction measuring and $Cx2$ represents a crystallinity obtained by X-ray diffraction measuring as the powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

The relations (1) to (3) regulates properties of the same powder for solid freeform fabrication from different points of views and relate to each other.

Measuring Method of Melting Starting Point of Condition 1 According to Differential Scanning calorimetry Measuring The measuring method of the melting starting temperature according to differential scanning calorimetry (DSC) of the relation (1) is based on the measuring method of ISO 3146 regulation (plastic transition temperature measuring method, JIS K7121 format). A differential scanning calorimeter (for example, DSC-60A, manufactured by Shimadzu Corporation) is used to measure the melting starting temperature (Tmf1) of the endothermic peak when the powder is heated to the temperature 30 degrees C. higher than the melting point thereof at a temperature rising speed of 10 degrees C. per minute. Thereafter, the powder is cooled down to −30 degrees C. or lower at a temperature falling speed of 10 degrees C. per minute and heated to the temperature 30 degrees C. higher than the melting point at a temperature rising speed of 10 degrees C. per minute to measure the melting starting temperature (Tmf2) of the endothermic peak. The melting starting temperature of the endothermic peak represents a temperature at a point −15 mW lower from a straight line drawn parallel to X axis from a site where quantity of heat becomes constant after endotherm at the melting point is finished to the lower temperature side.

Measuring Method of Crystallinity of Condition 2 According to Differential Scanning calorimetry Measuring The measuring method of crystallinity of differential scanning calorimetry (DSC) of the condition (2) is based on the measuring method according to ISO 3146 regulation (plastic transition temperature measuring method, JIS K7121 format). The energy amount (heat amount of melting) of an endothermic peak when heated to the temperature 30 degrees C. higher than the melting point of powder at a temperature rising speed of 10 degrees C. per minute is measured to obtain crystallinity (Cd1) from the heat amount of melting against the heat amount of complete crystallization. Thereafter, the powder is cooled down to −30 degrees C. or lower at a temperature falling speed of 10 degrees C. per minute and heated to the temperature 30 degrees C. higher than the melting point at a temperature rising speed of 10 degrees C. per minute to measure the energy amount of the endothermic peak so that crystallinity (Cd2) can be obtained as the ratio of the heat amount of melting against the heat amount of complete crystallization.

Measuring Method of Crystallinity According to X-ray Analyzer of Relation 3

Crystallinity of powder of the relation 3 is obtained by placing the powder on a glass plate to measure crystallinity (C×1) thereof by an X-ray analyzer (for example, Discover 8, manufactured by Bruker Corporation) including a two-dimensional detector at a 2θ range of from 10 to 40 at room temperature. Next, in the DSC, in a nitrogen atmosphere, the powder is heated to 30 degrees C. higher than the melting point thereof at a temperature rising speed of 10 degrees C. per minute. The temperature is maintained for 10 minutes and the temperature of the powder (sample) is back to room temperature after being cooled down to −30 degrees C. at a temperature falling speed of 10 degrees C. per minute. Crystallinity (C×2) can be measured like C×1.

Method of Manufacturing Powder

To manufacture the powder for solid freeform fabrication as an example of the powder, it is preferable to make a pellet, etc., containing material constituting the particle for solid freeform fabrication into columnar fibrous material, unify the columnar fibrous material to obtain a unified material, cut the unified columnar material to obtain a cut article, and stir the cut article.

In the fiber-producing step, it is preferable to extrude resin melt liquid into a fibrous form while stirring the resin melt liquid at a temperature 30 degrees C. or greater higher than the melting point using an extruder. It is preferable to extend (stretch) the resin melt liquid to about 1/1 to about 1/10 to obtain the fibrous form. The form of the cross section of the fiber depends on the form of the nozzle orifice of the extruder. For example, if the cross section is circular, the nozzle orifice is preferably circular. In this fiber-producing step, crystallinity of the resin can be controlled as described above.

In the unifying process, a plurality of fibrous materials produced in the fiber-producing process are arranged side by side in the same direction for unification. As a method of unifying the fibrous materials, there are a method of unifying the materials into a sheet-like form by applying heat under a pressure and a method of unifying the materials by adding water to the materials to cool them down to fix them in ice. The method of unifying the materials into a sheet-like form by applying a pressure and heat is preferable. In this step, the fibrous material can be fixed. The applied heat depends on the kind of the resin to be used in the unification into a sheet-like form upon application of heat and pressure. The temperature is preferably the melting point thereof or lower and more preferably 100 degrees C. lower than the melting point or higher. In addition, the applied pressure is preferably 10 MPa or lower. The heat and the pressure are preferably within the range in which each united fiber is separated after the next step of cutting. During "Heated under a pressure", it is preferable but not necessary to apply heat and pressure at the same time. However, for example, it is possible to apply a pressure to the material in a residual heat remaining state after the heat application. In addition, the unified material is not limited to a sheet-like form if the next step of cutting is suitably processed. Also, the disposition direction of the fiber is not necessarily completely but substantially the same.

When the cross-section of the form of the fibrous material obtained in the fiber-producing process is a circle, the fibrous material is partially or entirely transformed into a form having a polygonal cross-section. This makes it possible to produce a unified material in which a fibrous material having a polygonal cross section is unified.

In the cutting step, it is preferable to continuously cut the unified material manufactured in the unification process to obtain a cut article. As the cutting device, it is possible to use, for example, a cutter employing guillotine having a top blade and a bottom blade, a cutter employing a press-cutting method using a bottom plate and top blade, and a cutter to cut a material utilizing $CO_2$ laser beams, etc. The unified material is cut with such a cutter in such a manner that the material can have a cutting surface perpendicular to the longitudinal direction of the fiber forming the unified material. The cut width of the cutting device is preferably 5.0 to 100.0 µm. In addition, the cutting speed of the cutting device is not particularly limited. For example, it is preferably from 10 to 1000 shots per minute (spm).

In the stirring process, it is preferable that the cut article produced in the cutting process be stirred to melt the surface due to mechanical friction to obtain a columnar article. As a method of stirring, various spherical shaping methods such as a method of colliding the cut articles with each other and a method of colliding the cut article with a substance other than the cut article. However, the method is not limited thereto. The number of rotations during stirring is preferably from 500 to 10,000 rpm. The rotation time during stirring is preferably from 1 to 60 minutes. Due to this process, the first peripheral area and the second peripheral area can be manufactured.

Figure 4:
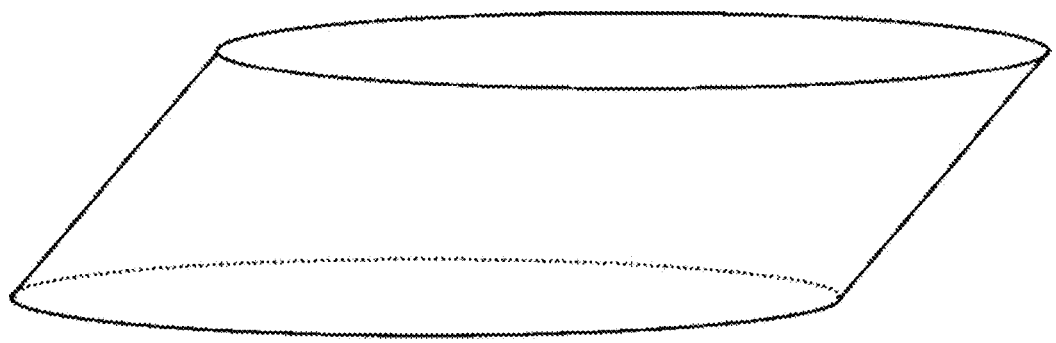
FIG. 4 is a schematic diagram illustrating an example of a cut article formed by cutting a resin having a cylindrical form in a diagonal direction.

In these processes, since the unified fibrous material is cut after the position and the orientation of the unified fibrous material are fixed, the cutting width and the cutting direction of the resin for solid freeform fabrication can be uniform, thereby obtaining columnar articles having a uniform form. That is, as in the conventional method, in a method of fixing fibers with moving clamps, moving them toward a cutting device, and cutting the resin fibers to obtain powder, the fibers are not sufficiently fixed. Therefore, at the time of cutting, the fibers move during cutting, so that the cutting width and the cutting direction vary. This variation of the cutting width and the cutting direction causes production of cut articles having different size and forms. In addition, for example, a massive amount of powder having an unexpected form is produced due to cutting a resin having a cylindrical form in a diagonal way as illustrated in the schematic diagram of FIG. 4. In the case of using such a cut article, since the solid form is asymmetrical, it is difficult to obtain a large number of columnar articles having a form in which one of the end surfaces partially covers the side surface even after the stirring treatment. Further, if the size of the cut article is unequal, the cut articles are flattened by an excessive force received in the stirring process, and in particular, large cut articles in comparison with other cut articles cannot have desired forms. Therefore, in order to make the content (on number basis) of the columnar articles 50 percent or more, it is preferable to undergo the fiber-producing process, the unification process, the cutting process, and the stirring process described above and it is more preferable to be subject to undergo a unification process of forming a sheet-like form upon application of heat under a pressure.

Usage of Powder

The powder of the present embodiment strikes a suitable balance between parameters such as granularity, particle size distribution, heat transfer properties, melt viscosity, bulk density, flowability, melting temperature, and recrystallization temperature. This powder is suitably used in methods for manufacturing a solid freeform fabrication using powder such as SLS, SMS, multi jet fusion (MJF), and binder jetting (BJ). The powder of the present embodiment can be suitably used as a surface modifying agent, a spacer, a lubricant, a paint, a grind stone, an additive, a secondary battery separator, foods, cosmetics, and cloths. In addition, it can be used as material or metal substitution material for use in fields such as auto mobiles, precision devices, semiconductor, aerospace, and medicines.

Device for Manufacturing Solid Freeform Fabrication Object

The device for manufacturing a solid freeform fabrication object includes a layer forming device to form a layer including the powder for solid freeform fabrication object and a melting device to melt the layer with electromagnetic irradiation and may furthermore optionally include other devices.

Examples of the layer forming device include rollers, blades, brushes, etc., or combinations thereof.

Examples of the electromagnetic wave generator for use in a melting device are $CO_2$ lasers, infrared irradiation sources, microwave generators, radiant heaters, LED lamps, and combinations thereof.

Figure 5:
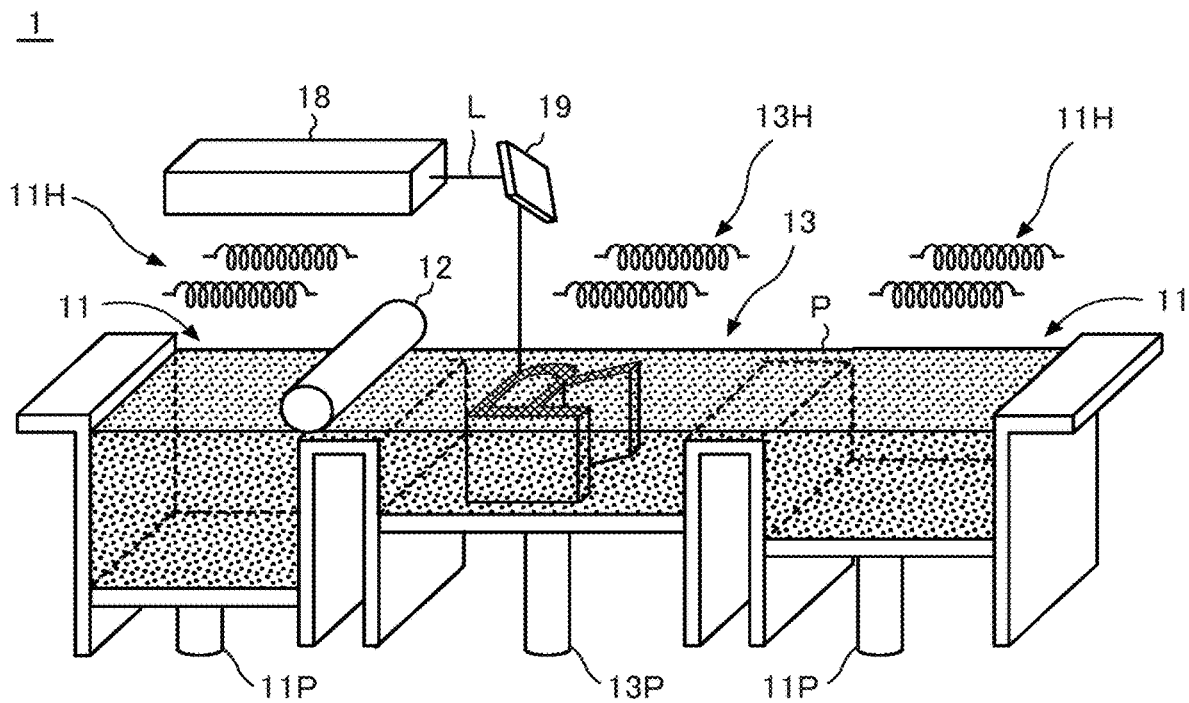
FIG. 5 is a schematic diagram illustrating a device for manufacturing a solid freeform fabrication object according to an embodiment of the present disclosure.

The device for manufacturing a solid freeform fabrication object with the powder for solid freeform fabrication is described with reference to FIG. 5. FIG. 5 is a schematic diagram illustrating the device for manufacturing a solid freeform fabrication object according to an embodiment of the present disclosure.

As illustrated in FIG. 5, a solid freeform fabrication device 1 includes a supply tank 11 as an example of the accommodating device to accommodate resin powder P for fabrication, a roller 12 to supply the resin powder P accommodated in the supply tank 11, a laser scanning space 13 where the resin powder P supplied by the roller 12 is disposed and scanned with a laser L, an electromagnetic irradiation source 18 as the irradiation source of the laser L as electromagnetic rays, and a reflection mirror 19 to reflect the laser L emitted from the electromagnetic irradiation source 18 to a determined position on the laser scanning space 13. In addition, the solid freeform fabrication device 1 further includes heaters 11H and 13H to respectively heat the resin powder P in the supply tank 11 and the resin powder P accommodated in the laser scanning space 13.

The reflection surface of the reflection mirror 19 moves based on two-dimensional data of a three-dimensional (3D) model while the electromagnetic irradiation source 18 emits the laser L. The two dimensional data of the 3D model represents each cross section form for a 3D model sliced with a predetermined interval. Therefore, when the reflection angle of the laser L changes, the portion indicated by the two-dimensional data in the laser scanning space 13 is selectively irradiated with the laser L. The resin powder positioned at the irradiation position of the laser L is melted and sintered to form a layer. That is, the electromagnetic irradiation source 18 serves as a layer forming device to form each layer of a fabrication object from the resin powder P.

In addition, the supply tank 11 and the laser scanning space 13 of the solid freeform fabrication device 1 respectively includes pistons 11P and 13P. The pistons 11P and 13P respectively move the supply tank 11 and the laser scanning space 13 up and down against the lamination direction of the fabrication object at the completion of forming a layer. Due to this, fresh resin powder P for use in fabrication of a new layer can be supplied from the supply tank 11 to the laser scanning space 13.

The solid freeform fabrication device 1 changes the irradiation position of the laser by the reflection mirror 19 to selectively melt the resin powder P. The present disclosure does not limit thereto. The powder of the present embodiment can be suitably used in a fabrication device employing selective mask sintering (SMS) method. In the SMS method, for example, resin powder is partially masked by a shielding mask and the unmasked portion is irradiated with electromagnetic rays such as infrared rays so that the resin powder is selectively melted to obtain a fabrication object. In the case of using the SMS process, the resin powder P preferably contains at least one of a heat absorbent, dark material, etc. to reinforce infrared absorbability. Examples of the heat absorbent or the dark material are carbon fiber, carbon black, carbon nano tube, and cellulose nano fiber. The SMS process suitably usable is described in, for example, the specification of U.S. Pat. No. 6,531,086.

Method of Manufacturing Solid Freeform Fabrication Object

The method of manufacturing a solid freeform fabrication object (3D modeling object) includes repeating a layer forming process to form a layer including the powder for solid freeform fabrication and a melting process of melting the layer with electromagnetic irradiation and may furthermore optionally include other processes.

Examples of the layer forming step include forming a layer by a roller, a blade, a brush, or a combination thereof.

Examples of the melting step include melting with electromagnetic irradiation source such as $CO_2$ laser beams, an infrared irradiation source, a microwave generator, a radiant heater, an LED lamp, and a combination thereof.

FIGS. 6 and 7 are conceptual diagrams illustrating a method of manufacturing a solid freeform fabrication object. The method of manufacturing a solid freeform fabrication object using the solid freeform fabrication device 1 is described with reference to FIGS. 6 and 7.

Figure 6A:
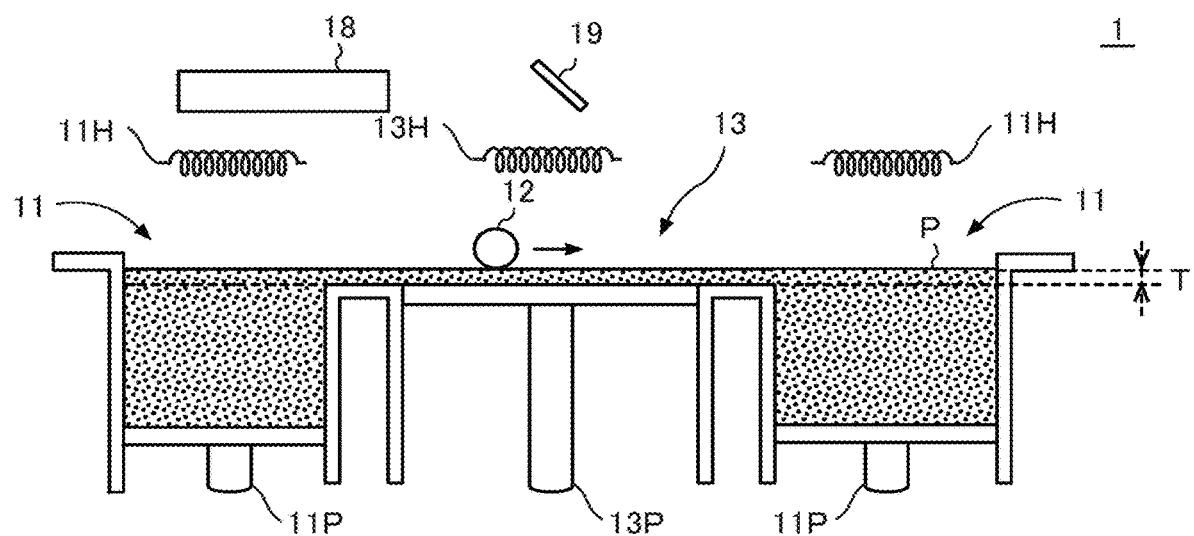
FIGS. 6A and 6B are conceptual diagrams illustrating examples of the method of manufacturing a solid freeform fabrication object.

The heater 11H applies heat to the resin powder P accommodated in the supply tank 11. The temperature of the supply tank 11 is preferably as high as possible but not higher than the melting point of the resin particle P to reduce warp which occurs during melting ascribable to laser irradiation. However, to prevent melting of the resin powder P in the supply tank 11, the temperature is at least 10 degrees C. lower than the melting point of the resin powder P. As illustrated in FIG. 6A, as one example of the supply process, the engine of the solid freeform fabrication device 1 drives the roller 12 to supply the resin powder P in the supply tank 11 to the laser scanning space 13 and level the laser scanning space 13, thereby forming a powder layer having a thickness of T corresponding to the thickness of a single layer. The heater 13H applies heat to the resin powder P supplied to the laser scanning space 13. The temperature of the laser scanning space 13 is preferably as high as possible in order to reduce warp occurring during melting due to laser irradiation but at least 5 degrees C. lower than the melting point of the resin particle P to prevent melting of the resin powder P at the laser scanning space 13.

Figure 6B:
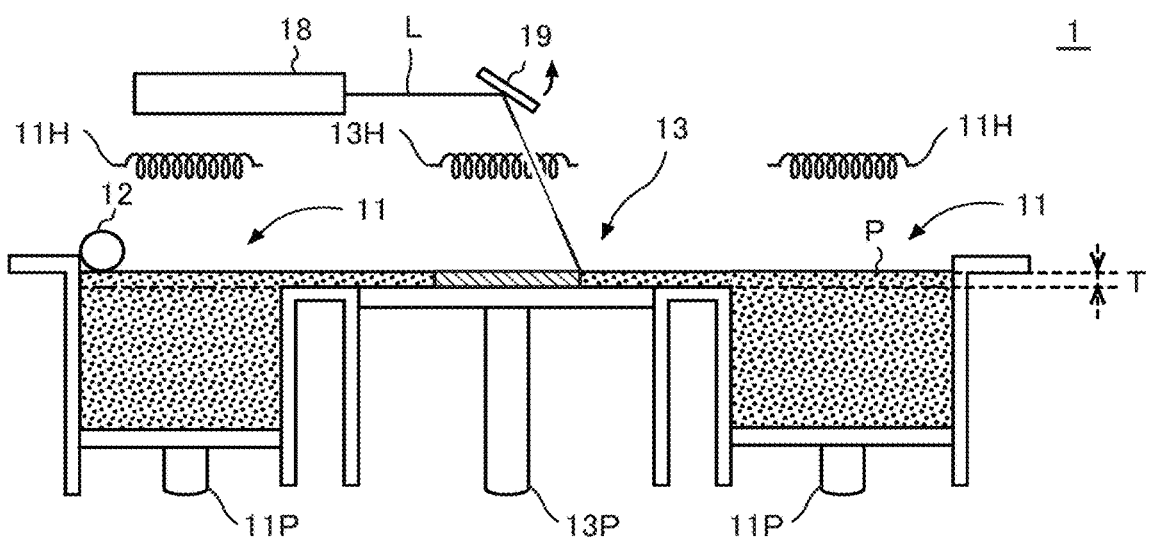

The engine of the solid freeform fabrication device 1 receives input of multiple two-dimensional data created from the 3D model. As illustrated in FIG. 6B, the engine of the solid freeform fabrication device 1 causes the electromagnetic irradiation source 18 to emit laser beams while moving the reflection surface of the reflection mirror 19 based on the two dimensional data for the part closest to the base of a fabrication object of the multiple two dimensional data. The power of the laser has no particular limit and can be suitably selected to suit to a particular application. For example, it is preferably from 10 to 150 W. Due to the irradiation of the laser, of the powder layers, the resin powder P positioned corresponding to the pixel indicated by the two dimensional data for the part closest to the base of a fabrication object is melted. At the completion of the laser irradiation, the melted resin cures to form a sintered layer having a form in accordance with the two dimensional data for the part closest to the base of a fabrication object.

The thickness T of the sintered layer has no particular limit. For example, the average of the thickness T is preferably 10 μm or greater, more preferably 50 μm or greater, and furthermore preferably 100 μm or greater. The thickness T of the sintered layer has no particular limit. For example, the average is preferably less than 200 μm, more preferably less than 150 μm, and furthermore preferably less than 120 μm.

Figure 7A:
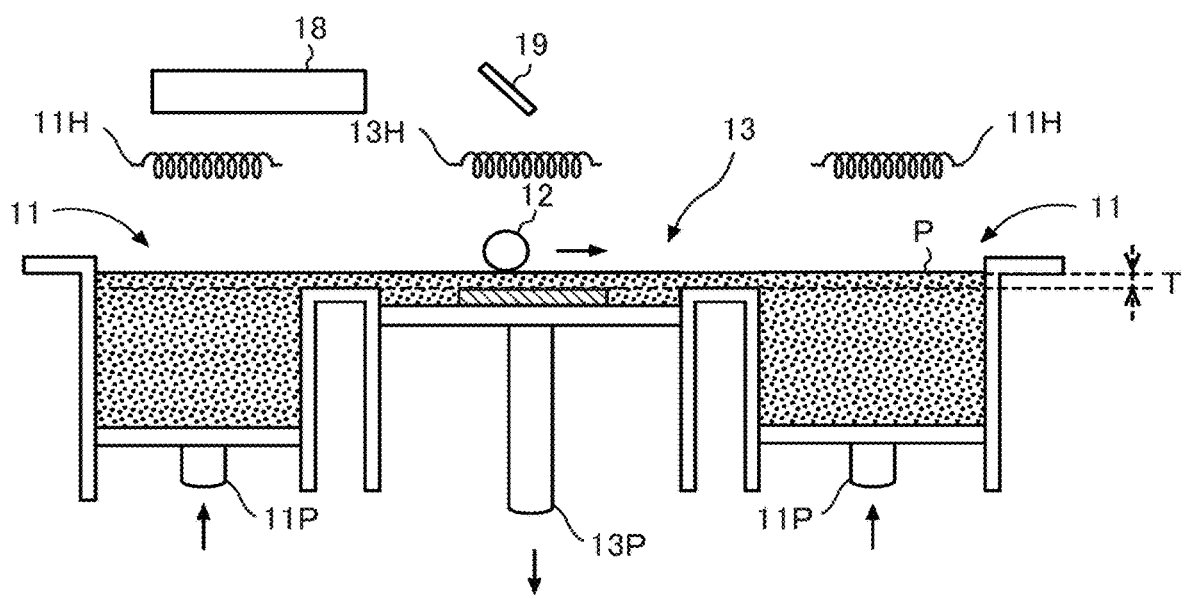
FIGS. 7A and 7B are conceptual diagrams illustrating other examples of the method of manufacturing a solid freeform fabrication object.

As illustrated in FIG. 7A, at the forming of the sintered layer closest to the base, the engine of the solid freeform fabrication device 1 lowers the laser scanning space 13 in an amount corresponding to the thickness T corresponding to the thickness of a single layer by the piston 13P to form a fabrication space having a thickness T on the laser scanning space 13. In addition, the engine of the solid freeform fabrication device 1 elevates the piston 11P to supply fresh resin powder P. Thereafter, as illustrated in FIG. 7A, the engine of the solid freeform fabrication device 1 drives the roller 12 to supply the resin powder P in the supply tank 11 to the laser scanning space 13 and level the laser scanning space 13, thereby forming a powder layer having a thickness of T corresponding to the thickness of a single layer.

Figure 7B:
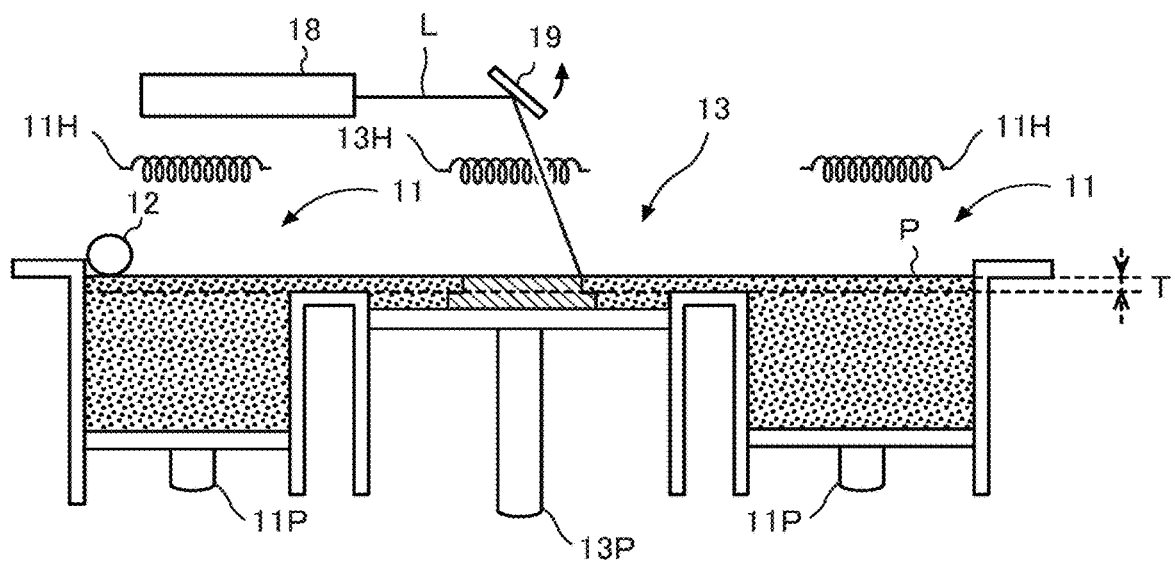

As illustrated in FIG. 7B, the engine of the solid freeform fabrication device 1 causes the electromagnetic irradiation source 18 to emit laser beams while moving the reflection surface of the reflection mirror 19 based on the two dimensional data for the layer second closest to the base of the multiple two-dimensional data. Due to the irradiation of the laser, of the powder layers, the resin powder P positioned corresponding to the pixel indicated by the two dimensional data for the layer second closest to the base is melted. At the completion of the laser irradiation, the melted resin cures to form and laminate the sintered layer having a form of the two-dimensional data for the layer second closest to the base on the sintered layer closest to the base.

The solid freeform fabrication device 1 repeats the supplying process and the layer forming process to laminate sintered layers. At the completion of fabrication based on all of the multiple two-dimensional data, a fabrication object having the same form as the 3D model is obtained.

Solid Freeform Fabrication Object

The solid freeform fabrication object can be suitably manufactured by the method of manufacturing a solid freeform fabrication object of the present disclosure.

EXAMPLES

Next, the present disclosure is described in detail with reference to Examples but is not limited thereto.

Example 1

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof and thereafter the resin melt liquid for solid freeform fabrication was extruded (stretched) into a fibrous form using an extruder (manufactured by The Japan Steel Works, LTD.) having a nozzle having a circular orifice. The fiber was adjusted to have a fiber diameter of 55 μm by stretching it 4 times. Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal. Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.). Thereafter, in order to melt the surface by mechanical friction, the obtained cut article was treated with a multipurpose mixer (manufactured by Nippon Coke & Engineering Co., Ltd.) at a rotation speed of 9000 rpm for 20 minutes to obtain resin powder for solid freeform fabrication. This was determined as the resin powder for solid freeform fabrication of Example 1.

Example 2

The resin powder for solid freeform fabrication of Example 2 was obtained in the same manner as in Example 1 except that the time for stirring treatment in Example 1 using a multipurpose mixer (manufactured by Nippon Coke & Engineering Co., Ltd.) was changed from 20 minutes to 10 minutes.

Example 3

The resin powder for solid freeform fabrication of Example 3 was obtained in the same manner as in Example 1 except that the time for stirring treatment in Example 1 using a multipurpose mixer (manufactured by Nippon Coke & Engineering Co., Ltd.) was changed from 20 to 5 minutes.

Example 4

The resin powder for solid freeform fabrication of Example 4 was obtained in the same manner as in Example 3 except that the number of rotation for stirring treatment in Example 3 using a multipurpose mixer (manufactured by Nippon Coke & Engineering Co., Ltd.) was changed from 9000 to 6000 rpm.

Example 5

The resin powder for solid freeform fabrication of Example 5 was obtained in the same manner as in Example 3 except that the number of rotation for stirring treatment in Example 3 using a multipurpose mixer (manufactured by Nippon Coke & Engineering Co., Ltd.) was changed from 9000 to 3000 rpm.

Example 6

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof and thereafter the resin melt liquid for solid freeform fabrication was extruded (stretched) into a fibrous form using an extruder (manufactured by The Japan Steel Works, LTD.) having a nozzle having a circular orifice. The fiber was adjusted to have a fiber diameter of 55 μm by stretching it 4 times. Thereafter, the formed fibers were disposed side by side in the same direction. Thereafter, water was applied to the fibers, which was thereafter cooled to be fixed in ice. Further, the fibers fixed in ice were cut in such a manner that the cut width was 50 μm and the cut speed was 280 shots per minute (spm) using a push-off type cutting device (NJ Series 1200 type, manufactured by Ogino Seiki Co., Ltd.). Thereafter, in order to melt the surface by mechanical friction, the obtained cut article was treated with a multipurpose mixer (manufactured by Nippon Coke & Engineering Co., Ltd.) at a rotation speed of 9000 rpm for 20 minutes to obtain resin powder for solid freeform fabrication. This was determined as the resin powder for solid freeform fabrication of Example 6.

Example 7

The resin powder for solid freeform fabrication of Example 7 was obtained in the same manner as in Example 6 except that the number of rotation for stirring treatment in Example 6 using a multipurpose mixer (manufactured by Nippon Coke & Engineering Co., Ltd.) was changed from 9000 to 3000 rpm and the time for stirring treatment was changed from 20 to 5 minutes.

Example 8

The resin powder for solid freeform fabrication of Example 8 was obtained in the same manner as in Example 1 except that polybutylene terephthalate (PBT) resin was changed to polyacetal (POM) resin (Jupital® F10-01, melting point of 175 degrees C., manufactured by Mitsubishi Engineering-Plastics Corporation).

Example 9

The resin powder for solid freeform fabrication of Example 9 was obtained in the same manner as in Example 1 except that polybutylene terephthalate (PBT) resin was changed to polyamide 12 (PA12) resin (DADIAMID L2121, melting point of 172 degrees C., manufactured by Daicel-Evonik Ltd.).

Example 10

The resin powder for solid freeform fabrication of Example 10 was obtained in the same manner as in Example 1 except that the polybutylene terephthalate (PBT) resin was changed to polyetherether ketone (PEEK) resin (HT P22PF, melting point of 343 degrees C., glass transition temperature of 143 degrees C., manufactured by VICTREX plc.).

Example 11

The resin powder for solid freeform fabrication of Example 11 was obtained in the same manner as in Example 1 except that polybutylene terephthalate (PBT) resin was changed to polypropylene (PP) resin (NOVATEC™ MA3, melting point of 180 degrees C., glass transition temperature of 0 degrees C., manufactured by JAPAN POLYPROPYLENE CORPORATION).

Example 12

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof and thereafter the resin melt liquid for solid freeform fabrication was extruded (stretched) into a fibrous form using an extruder (manufactured by The Japan Steel Works, LTD.) having a nozzle having a circular orifice. The fiber was adjusted to have a fiber diameter of 55 μm by stretching it 4 times. Thereafter, the formed fibers were aligned in the same direction and fixed with a movable clamp. Further, the fibers fixed by the clamp were cut in such a manner that the cut width was 50 μm and the cut speed was 280 shots per minute (spm) using a push-off type cutting device (NJ Series 1200 type, manufactured by Ogino Seiki Co., Ltd.). Thereafter, in order to melt the surface by mechanical friction, the obtained cut article was treated with a multipurpose mixer (manufactured by Nippon Coke & Engineering Co., Ltd.) at a rotation speed of 1000 rpm for 20 minutes to obtain resin powder for solid freeform fabrication. This was determined as the resin powder for solid freeform fabrication of Example 12.

Comparative Example 1

The resin powder for solid freeform fabrication of Comparative Example 1 was obtained in the same manner as in Example 1 except that the stirring treatment for the polybutylene terephthalate (PBT) resin in Example 1 using a multipurpose mixer (manufactured by Nippon Coke & Engineering Co., Ltd.) was not conducted.

Comparative Example 2

The resin powder for solid freeform fabrication of Comparative Example 2 was obtained in the same manner as in Example 6 except that the stirring treatment for the polybutylene terephthalate (PBT) resin in Example 6 using a multipurpose mixer (manufactured by Nippon Coke & Engineering Co., Ltd.) was not conducted.

Comparative Example 3

The resin powder for solid freeform fabrication of Comparative Example 3 was obtained in the same manner as in Example 12 except that the stirring treatment for the polybutylene terephthalate (PBT) resin in Example 12 using a multipurpose mixer (manufactured by Nippon Coke & Engineering Co., Ltd.) was not conducted.

With respect to the resin powder for solid freeform fabrication obtained in each Example and Comparative Example, the form of the powder was observed in the following manner and the content of the columnar articles and the shortest length of the first peripheral area and the second peripheral were measured. The results are shown in Table 1.

Form of Powder

The obtained resin powder for solid freeform fabrication was photographed at a magnifying power of 150× using an SEM (JSM-7800 FPRIME, manufactured by JEOL Ltd.). In the resin powder for solid freeform fabrication in the thus-obtained SEM image, powder determined as columnar article had a first surface, a second surface, and a side surface and had at least one of the peripheral area of the first surface and the peripheral area of the second surface partially or entirely stretching along the side surface in the area observed by the SEM.

Next, the side face of the powder for solid freeform fabrication determined as a columnar article was observed. When the powder was observed to have multiple surfaces segmented by lines (corners) in the height direction of the columnar article, the first opposing surface and the second opposing surface were determined as substantially polygonal. When the powder was observed to have uniformly smooth surface without lines in the height direction of the columnar article, the first opposing surface and the second opposing surface were determined as substantially circular (substantially truly circular or substantially ellipsoidal).

Proportion of Particle for Solid Freeform Fabrication (Columnar-article)

The obtained resin powder for solid freeform fabrication was photographed at a magnifying power of 150× using an SEM (JSM-7800 FPRIME, manufactured by JEOL Ltd.). In the resin powder for solid freeform fabrication in the thus-obtained SEM image, powder determined as columnar article had a first surface, a second surface, and a side surface and had at least one of the peripheral area of the first surface and the peripheral area of the second surface partially or entirely stretching along the side surface in the area observed by the SEM.

Next, from the SEM image, the number of the resin powder for solid freeform fabrication and the number of the columnar articles were obtained. The proportion (percent) on number basis of the columnar article was calculate by dividing the number of columnar articles by the number of the resin powder for solid freeform fabrication followed by multiplication by 100. In addition, when counting the number of resin powder for solid freeform fabrication and the number of columnar articles from the SEM image, only the powder for solid freeform fabrication and the columnar article having a longest part of 20 μm or more were counted. Further, the number of the resin powder for solid freeform fabrication was 100 for calculating the proportion of the columnar article.

Shortest Length of Peripheral Area of First Surface and Second Surface

The obtained resin powder for solid freeform fabrication was photographed at a magnifying power of 150× using an SEM (JSM-7800 FPRIME, manufactured by JEOL Ltd.). In the resin powder for solid freeform fabrication in the thus-obtained SEM image, powder determined as columnar article had a first surface, a second surface, and a side surface and had at least one of the peripheral area of the first surface and the peripheral area of the second surface partially or entirely stretching along the side surface in the area observed by the SEM.

Next, the shortest lengths (μm) of the peripheral area of the first area and the peripheral area of the second peripheral area in the height direction of the columnar article were calculated for the columnar article in the area observed by an SEM.

TABLE 1

| | Recipe | | | SEM | | | |
| | | | | | Form of | Proportion of | Minimum length of |
| | Resin material | Unification process | Stirring process | Columnar article | opposing surface | columnar article | peripheral area |
|---|---|---|---|---|---|---|---|
| Example 1 | PBT | Sheet method | Yes | Yes | Substantially polygonal | 90 percent | 5 μm |
| Example 2 | PBT | Sheet method | Yes | Yes | Substantially polygonal | 80 percent | 4 μm |
| Example 3 | PBT | Sheet method | Yes | Yes | Substantially polygonal | 70 percent | 3 μm |
| Example 4 | PBT | Sheet method | Yes | Yes | Substantially polygonal | 60 percent | 2 μm |
| Example 5 | PBT | Sheet method | Yes | Yes | Substantially polygonal | 50 percent | 1 μm |
| Example 6 | PBT | ice | Yes | Yes | Substantially circular | 70 percent | 2 μm |
| Example 7 | PBT | ice | Yes | Yes | Substantially circular | 50 percent | 1 μm |
| Example 8 | POM | Sheet method | Yes | Yes | Substantially polygonal | 90 percent | 5 μm |
| Example 9 | PA12 | Sheet method | Yes | Yes | Substantially polygonal | 90 percent | 5 μm |
| Example 10 | PEEK | Sheet method | Yes | Yes | Substantially polygonal | 90 percent | 5 μm |
| Example 11 | PP | Sheet method | Yes | Yes | Substantially polygonal | 80 percent | 4 μm |
| Example 12 | PBT | Clamp | Yes | Yes | Substantially polygonal | 40 percent | 2 μm |
| Comparative Example 1 | PBT | Sheet method | None | None | Substantially polygonal | 0 percent | — |
| Comparative Example 2 | PBT | ice | None | None | Substantially circular | 0 percent | — |
| Comparative Example 3 | PBT | Clamp | None | None | Substantially circular | 0 percent | — |

For each of the resin powder for solid freeform fabrication obtained in each Example and Comparative Example, loose density, volume average particle diameter Dv, number average particle diameter Dn, and strength of fabricated object were evaluated in the following manner. The results are shown in Table 2.

Loose Density

Loose density of the prepared resin powder for solid freeform fabrication was measured using a bulk density gauge (in accordance with JIS Z-2504 format, manufactured by "Kuramochi Kagaku Kikai Seisakusho"), and the measured loose density was divided by true density of each resin to determine loose filling ratio (percent). C or higher grades are evaluated as practical.

Evaluation Criteria

A: 40 percent or more
B: 35 percent to less than 40 percent
C: 33 percent to less than 35 percent
D: Less than 33 percent Volume Average Particle Diameter Dv and Number Average Particle Diameter Dn The volume average particle diameter Dv (μm) of the thus-obtained resin powder for solid freeform fabrication was measured by using a particle size distribution measuring instrument (Microtrac MT 3300EXII, manufactured by MicrotracBEL Corp.) employing a drying process (atmosphere) method without using a solvent, utilizing particle refractive index for each resin powder.

The number average particle diameter Dn (μm) of the thus-obtained resin powder for solid freeform fabrication was measured using a particle size distribution measuring instrument (F-PIA 3000, manufactured by Sysmex Corporation).

In addition, the ratio (Dv/Dn) of volume average particle diameter Dv/number average particle diameter Dn was calculated from the obtained number average particle diameter Dn and volume average particle diameter Dv.

Strength of Fabrication Object

The thus-obtained resin powder for solid freeform fabrication was added to the supplying bed of an SLS method fabrication device (AM S5500P, manufactured by Ricoh Company, Ltd.) to manufacture a solid freeform fabrication object. The setting conditions were: average layer thickness of 0.1 mm, a laser output of from 10 to 150 W, a laser scanning space of 0.1 mm, and a part bed temperature of −3 degrees C. below the melting point. In the SLS method fabrication device, five tensile test specimens (XY fabrication object) having a long side oriented in the XY plane direction (plane direction in which the roller 12 advances in FIG. 5) and five tensile test specimens (Z fabrication object) having a long side oriented in the Z axis direction (direction perpendicular to the plane in which the roller 12 advances in FIG. 5) were fabricated in the center part of the laser scanning space 13. The gap between each fabrication object was 5 mm or more. As the tensile test specimen, ISO (International Organization for Standardization Organization) 3167 Type 1A multi-purpose canine bone-like test specimen (specimen has a center portion of a length of 80 mm, a thickness of 4 mm, and a width of 10 mm) was used. The fabrication time was set to 50 hours.

Next, using the same resin powder for solid freeform fabrication, five tensile test specimens of the same form were molded by injection molding.

For the XY fabrication object and the Z fabrication object as the tensile test specimens obtained by the SLS method fabrication device and the tensile test specimens obtained by injection molding, a tensile tester (AGS-5 kN, manufactured by Shimadzu Corporation) according to ISO 527 regulation was used to measure tensile strength. The test speed in the tensile strength test was constant at 50 mm/minute. The tensile strength was determined as the average value of the measured values obtained by the test conducted five times for each tensile test specimen. Thereafter, the tensile strength of the tensile test specimen obtained by the SLS method fabrication device was divided by the tensile strength of the tensile test specimen obtained by injection molding to evaluate the tensile strength of the tensile test specimen obtained by the SLS method fabrication device.

The case where both the evaluations for the XY fabrication object and the Z fabrication object were 60 percent or more of the injection molded product was considered to be practical.

TABLE 2

| | Resin powder property | | | | Strength of fabrication object | |
|---|---|---|---|---|---|---|
| | Loose density | Dv | Dn | Dv/Dn | XY | Z |
| Example 1 | A (45 percent) | 70 | 60 | 1.17 | 100 percent | 90 percent |
| Example 2 | A (43 percent) | 70 | 60 | 1.17 | 95 percent | 85 percent |
| Example 3 | A (40 percent) | 70 | 60 | 1.17 | 90 percent | 75 percent |
| Example 4 | B (38 percent) | 70 | 60 | 1.17 | 80 percent | 70 percent |
| Example 5 | B (35 percent) | 70 | 60 | 1.17 | 70 percent | 65 percent |
| Example 6 | B (37 percent) | 70 | 60 | 1.17 | 75 percent | 65 percent |
| Example 7 | C (33 percent) | 70 | 60 | 1.17 | 65 percent | 60 percent |
| Example 8 | A (43 percent) | 70 | 60 | 1.17 | 95 percent | 85 percent |
| Example 9 | A (43 percent) | 70 | 60 | 1.17 | 95 percent | 85 percent |
| Example 10 | A (43 percent) | 70 | 60 | 1.17 | 95 percent | 85 percent |
| Example 11 | A (42 percent) | 70 | 55 | 1.27 | 90 percent | 85 percent |
| Example 12 | C (33 percent) | 70 | 30 | 2.33 | 70 percent | 70 percent |
| Comparative Example 1 | C (33 percent) | 70 | 60 | 1.17 | 60 percent | 50 percent |
| Comparative Example 2 | D (30 percent) | 70 | 60 | 1.17 | 50 percent | 40 percent |
| Comparative Example 3 | D (30 percent) | 90 | 30 | 3.00 | 45 percent | 40 percent |

The particle for solid freeform fabrication of the present disclosure has excellent packing density so that a solid freeform fabrication object formed by using the resin powder is excellent regarding strength.

Having now fully described embodiments of the present invention, it will be apparent to one of ordinary skill in the art that many changes and modifications can be made thereto without departing from the spirit and scope of embodiments of the invention as set forth herein.

What is claimed is:

1. A particle for solid freeform fabrication having a columnar form having end surfaces and a side surface, wherein the particle comprises at least one perimeter area continuous with one of the end surfaces via a curved surface so as to partially cover the side surface.

2. The particle according to claim 1, wherein one of the end surfaces covers an entire circumference of the side surface.

3. The particle according to claim 1, wherein the end surfaces comprise a first surface and a second surface.

4. A powder comprising:
the particle of claim 1.

5. The powder according to claim 4, wherein, in an area of the side surface covered with one of the end surfaces, a minimum length of the columnar form along a height direction is at least 1 µm.

6. The powder according to claim 4, wherein the particle accounts for 50 percent or more of the powder on a number basis.

7. The powder according to claim 4, wherein the particle accounts for 70 percent or more of the powder on a number basis.

8. The powder according to claim 4, wherein the end surfaces are substantially truly circular, substantially ellipsoidal, or substantially polygonal.

9. The powder according to claim 4, wherein the particle is substantially prismatic.

10. The powder according to claim 9, wherein the particle being substantially prismatic accounts for 40 percent or more of the powder on a number basis.

11. The powder according to claim 4, wherein the particle comprises at least one member selected from the group consisting of polybutylene terephthalate, polyamide, polyacetal, and polyether ether ketone.

12. A device for manufacturing a solid freeform fabrication object, comprising:
the powder of claim 4;
an accommodating device configured to accommodate the powder of claim 4;
a layer forming device configured to form a layer comprising the powder of claim 4; and
a melting device configured to melt the layer with electromagnetic irradiation.

13. A method of manufacturing a solid freeform fabrication object, comprising:
forming a layer comprising the powder of claim 4; and
melting the layer by electromagnetic irradiation.

14. A method of manufacturing the powder for solid freeform fabrication of claim 4, comprising:
forming a material constituting the powder into fibrous materials;
unifying the fibrous materials disposed side by side in a same direction to form a unified material;
cutting the unified material to obtain a cut article; and
stirring the cut article.

15. A method of manufacturing a powder for solid freeform fabrication, comprising:
forming a material constituting the powder into fibrous materials;
unifying the fibrous materials disposed side by side in a same direction to form a unified material;
cutting the unified material to obtain a cut article; and
melting at least one end surface of the cut article so that the particle comprises at least one perimeter area continuous with one end surface via a curved surface so as to partially cover a side surface of the cut article.

16. The method according to claim 15, wherein the fibrous materials are heated under a pressure in the unifying.

17. A particle having a columnar form having end surfaces and a side surface,
wherein the particle comprises at least one perimeter area continuous with one of the end surfaces via a curved surface so as to partially cover the side surface.

18. The particle of claim 17, wherein both of the end surfaces at least partially cover the side surface.

19. The particle of claim 18, wherein both of the end surfaces covers an entire circumference of the side surface.

20. The particle of claim 1, wherein at least one of the end surfaces is formed by melting after cutting to partially cover the side surface.

* * * * *